(12) United States Patent
Athalye

(10) Patent No.: US 11,852,206 B2
(45) Date of Patent: Dec. 26, 2023

(54) EPICYCLIC TRANSMISSION GEAR AND DISK BRAKE BASED REGENERATIVE BRAKING DEVICE

(71) Applicant: Ravi Ganesh Athalye, Maharashtra Pune (IN)

(72) Inventor: Ravi Ganesh Athalye, Maharashtra Pune (IN)

( * ) Notice: Subject to any disclaimer, the term of this patent is extended or adjusted under 35 U.S.C. 154(b) by 493 days.

(21) Appl. No.: 17/270,892

(22) PCT Filed: Oct. 17, 2018

(86) PCT No.: PCT/IN2018/050672
§ 371 (c)(1),
(2) Date: Feb. 24, 2021

(87) PCT Pub. No.: WO2020/044354
PCT Pub. Date: Mar. 5, 2020

(65) Prior Publication Data
US 2021/0180657 A1 Jun. 17, 2021

(30) Foreign Application Priority Data
Aug. 31, 2018 (IN) .............................. 201821032750

(51) Int. Cl.
*F16D 61/00* (2006.01)
*B60B 27/00* (2006.01)
(Continued)

(52) U.S. Cl.
CPC .......... *F16D 61/00* (2013.01); *B60B 27/0047* (2013.01); *B60B 27/0052* (2013.01);
(Continued)

(58) Field of Classification Search
CPC . F16D 61/00; F16D 67/02; F16H 1/28; F16H 57/10; F16H 2057/085; F16H 3/72;
(Continued)

(56) References Cited

U.S. PATENT DOCUMENTS

| 4,827,798 A | * | 5/1989 | Oldfield | .................... B60T 1/08 188/269 |
| 8,622,859 B2 | | 1/2014 | Babbitt et al. | |

(Continued)

FOREIGN PATENT DOCUMENTS

CN 106402205 A * 2/2017 ........... F16D 55/225

OTHER PUBLICATIONS

International Search Report and Written Opinion from PCT Application No. PCT/IN2018/050672, dated May 10, 2019.

*Primary Examiner* — Robert A. Siconolfi
*Assistant Examiner* — San M Aung
(74) *Attorney, Agent, or Firm* — WORKMAN NYDEGGER

(57) ABSTRACT

An epicyclic transmission gear and disk brake based regenerative braking device includes an epicyclic transmission unit to transfer braking energy through arrangement of sun gear and the planetary gears to a clock spring of a clock spring torque storage module. The device includes a disk brake unit that arrests the rotation of a sun-planetary gear assembly in the epicyclic transmission unit such that momentum available at the extended hub is transferred to a ring gear. The ring gear is connected to an inner casing of the clock spring torque storage module that charges the spring. The device includes a chassis unit that dissipates excess energy through spinning of an outer casing of the clock spring torque storage module by a spring calibration wheel that rides over a sinusoidal contoured surface of the outer casing.

12 Claims, 8 Drawing Sheets

(51) Int. Cl.
*B60B 27/02* (2006.01)
*B62L 1/00* (2006.01)
*F16D 67/02* (2006.01)
*F16H 57/10* (2006.01)
*B62L 3/02* (2006.01)
*F03G 1/08* (2006.01)
*F16H 1/28* (2006.01)
*F16H 57/08* (2006.01)
*F16D 7/02* (2006.01)

(52) U.S. Cl.
CPC ............ *B60B 27/023* (2013.01); *B62L 1/005* (2013.01); *F16D 7/02* (2013.01); *F16H 57/10* (2013.01); *B62L 3/02* (2013.01); *F03G 1/08* (2013.01); *F16H 1/28* (2013.01); *F16H 2057/085* (2013.01)

(58) Field of Classification Search
CPC ............ F16H 3/724; F16H 2200/2005; F16H 61/0021; F03G 1/08; B60B 27/0047; B60B 27/023; B60T 1/10; B60L 1/005; B60L 3/02; B60K 6/365; B60K 6/367; B60K 6/387; B60K 6/12; B60K 6/38; B60K 6/48; B60K 6/547; B60K 2006/126; B60K 2006/381; B60K 2006/4825; B60Y 2400/408; B60Y 2400/421; B60Y 2400/4244; Y02T 10/62; Y10S 903/91; Y10S 903/902
USPC ........................................................ 188/26
See application file for complete search history.

(56) References Cited

U.S. PATENT DOCUMENTS

| | | |
|---|---|---|
| 8,834,314 B2 | 9/2014 | Bergquist |
| 2010/0270096 A1* | 10/2010 | Holmes ................. B60K 6/547 903/904 |
| 2014/0045648 A1* | 2/2014 | Bangura ............... F02N 11/006 477/3 |
| 2014/0128193 A1* | 5/2014 | Bergquist .............. B60K 6/387 475/5 |

* cited by examiner

Section A-A

Section B-B

EPICYCLIC TRANSMISSION GEAR AND DISK BRAKE BASED REGENERATIVE BRAKING DEVICE

FIELD OF THE INVENTION

The present invention relates to regenerative braking mechanisms for vehicles and more particularly to a regenerative braking mechanism that is based on conventional disk brake and epicyclic gear transmission system.

BACKGROUND OF INVENTION

With the realization of the impact of the carbon footprint of devices on climate change vehicles have come into prominence being pedal powered and a low-cost option for transport.

Various attempts have been made to mechanically harness the braking energy normally lost in friction of conventional friction brakes. This is an element that contributes to the carbon footprint of a vehicle and needs to be reduced.

In previous art, clock spring has been used to provide braking and accelerating torque thereby enabling the Regenerative Braking function. Various mechanical methods have been employed for transferring vehicle momentum to a clock spring in the process of braking. However, each one has had their unique shortcomings.

For example, one of the systems includes the brake lever connected to a roller wheel which upon the brake lever operation, clamps it on the rotating wheel threaded surface. The roller wheel is connected through a chain to the clock spring thereby coiling it against the spring bias. This system derives the roller wheel contact force with the outer surface of the rear wheel from the brake lever grip force. Whereas the grip force is sufficient for braking in disk brakes, it severely limits the force of the roller to the wheel thus limiting the level of torque transferred causing slippage of the roller on the wheel surface. During making of the contact of the roller with the wheel surface there occurs frictional losses that reduces the efficiency of the transfer.

There is an art that employs gears that enable the fixed spring to be coupled to the moving vehicle wheel in an attempt to reduce the frictional losses associated with the previous art. The stationery gear connected to the spring is made to mate with a rotating gear connected to vehicle hub. The art suffers from a shortcoming that the user is required to match the speed of the gears involved by back pedalling which speeds up the gear connected to the spring before mating with the rotating gear connected to the wheel. Any mismatch leads to the gears grating and increasing transfer losses leading to loss of efficiency. The technique for speed matching is itself a barrier to its use.

Accordingly, there is need of a user friendly regenerative braking system that eliminates the limitation of maximum torque transfer and frictional loss as well as eliminates the need for the user to master the technique of synchro meshing the gears. Moreover, there is need of the regenerative braking system that is located at the hub of the wheel where the torque at transfer is higher than at the rim of the wheel.

SUMMARY OF THE INVENTION

The present invention provides an epicyclic transmission gear and disk brake based regenerative braking device with spring as energy storage device. The epicyclic transmission is innovatively adapted and located at the vehicle hub to make it compatible for the function of momentum transfer with direction reversal. The configuration introduces a method that eliminates the frictional losses as well as replaces the gear synchro technique with a conventional brake On/Off functionality.

The epicyclic transmission gear and disk brake based regenerative braking device includes an epicyclic transmission unit that is composed of three co-axial gears and preferably includes a sun gear, a set of planetary gears and a ring gear. The sun gear is centrally positioned, and it mates with a set of a plurality of planetary gears, preferably three planetary gears that are capable of revolving around the sun gear while making contact both with sun gear and the internal gears of the outer most ring gear. The planetary gears have their axes mounted on a band called the carrier plate. The epicyclic transmission gear unit connects with a vehicle rear hub, the disk brake and a clock spring torque storage module.

The sun gear is mounted co axial to the extended hub of the rear wheel of the vehicle on the far side of the vehicle chain side. The carrier plate and the ring gear are also mounted coaxial to the extended hub of the rear wheel. The carrier plate is adapted to be connected to a disk brake frictional surface. The ring gear is adapted to be connected to the clock spring module.

The clock spring torque storage module includes an inner casing and a co axial outer casing. A clock spring is mounted between the two with one end affixed to the inner casing and the other end to the outer casing. The outer casing is stationery with respect to the vehicle frame and is secured to it through a spring adjustable restraint that allows the outer casing to rotate with the spring if a pre-determined torque threshold is exceeded. The inner casing is co axially mounted on the vehicle extended hub through a one-way clutch bearing. This allows the inner casing to be securely rotated with the hub when it rotates in the forward direction of the wheel and only when it rotates faster than the wheel. When the inner casing rotates slower than the hub or it rotates counter to the wheel rotation it does not influence the hub/wheel rotation.

The ring gear is secured to the inner casing of the spring module such that if it rotates counter to the sun gear rotation direction, it turns the inner casing counter too and charges/coils the spring.

The epicyclic transmission unit is designed such that the sun gear forward motion manifest as rotation of the planetary gears around the sun gear when the carrier is free to rotate and the ring gear is stationery. If the carrier is arrested, the planetary gears rotation around the sun gear is arrested. This results in forward motion of the sun gear to be transferred through the planetary gear to the ring gear in a direction counter to the sun gear. During this function the planetary gears can only rotate around their own axis.

Since the ring gear is connected to the inner casing the spring is coiled in the reverse direction to the vehicle hub. The coil when fully charged cannot turn any more unless the outer casing rotates with it. The outer casing secured to the vehicle frame through a calibrated restraint mechanism that includes a calibration wheel that rotates after the spring is fully coiled until the vehicle comes to a complete halt.

By releasing the brake lever the carrier is free to rotate and so is the sun gear in the direction of the coil unwinding direction. This causes the vehicle hub to accelerate due to the spring discharge. At the moment the spring is fully discharged or when the vehicle wheel is faster than the inner casing, the spring is fully released from influencing the forward motion of the vehicle.

The description of the physical construct of the epicyclic transmission gear and disk brake based regenerative braking device is described hereinafter.

The epicyclic transmission gear and disk brake based regenerative braking device includes an extended hub that connects to a conventional hub of a rear wheel of the vehicle through a plurality of connectors. The extended hub includes a first needle bush bearing positioned on outer surface thereof.

The epicyclic transmission gear and disk brake based regenerative braking device includes a disc brake clamp unit which includes a brake disc. The brake disc is positioned co axial to the extended hub. The disc brake clamp unit is configured to enable it to arrest rotation of the brake disc. The disc brake clamp unit connects to a hand brake lever of a hand brake.

The epicyclic transmission gear and disk brake based regenerative braking device includes an epicyclic transmission unit having a planet gear band, a sun gear, a ring gear and a plurality of planetary gears. The planet gear band is positioned on the needle bush bearing. The planet gear band has at least three arms that receive three planetary gear shafts through three openings respectively. Each planetary gear shaft has a second needle bush bearing positioned thereon. Each second needle bush bearing of the three gear shafts receive three planetary gears respectively. The sun gear is positioned on the extended hub. The sun gear meshes with the plurality of planetary gears. The ring gear is configured to receive momentum through the planetary gears in a direction reverse to rotation of the sun gear if the motion of the band or the carrier plate is arrested. The planet gear band connects to the brake disk of the disk brake unit to facilitate momentum transfer to the ring gear when its rotation is arrested.

The epicyclic transmission gear and disk brake based regenerative braking device includes a clock spring torque storage module that includes an inner casing connected to ring band, a one-way clutch bearing, an inner casing, a booster/clock spring and an outer casing. The one-way clutch bearing is positioned on the extended hub. The one-way clutch bearing receives the inner casing thereon. The inner casing is configured to receive momentum transfer from the ring gear. The outer casing has a sinusoidal contoured surface. The clock spring is configured to wrap during rotation of the inner casing in a direction opposite to rotation of rear wheel.

The epicyclic transmission gear and disk brake based regenerative braking device includes a strip chassis unit that is bolted on the shaft of the conventional hub. The strip chassis unit includes a calibration wheel loaded with a calibration screw and a spring. The calibration wheel is configured to engage with a sinusoidal contoured surface of the outer casing to arrest the outer casing from spinning below a predetermined torque such that if the inner casing receives a coiling torque above this predetermined threshold then the outer casing slips past the restraining calibration wheel thereby protecting the spring from high stress that could lead to shortening of its life and cause a catastrophic failure.

In the context of the present invention, the de acceleration is caused by spring resistance in braking and the acceleration takes place by the release of spring energy against friction of the wheel axle bearings. Since the spring resistance is several times more that of the resistance of the wheel bearings, the vehicle halts with few wheel turns however when the energy is released the clock spring encounters only bearing friction of the vehicle wheel hence takes several turns to dissipate the energy released.

In an exemplary embodiment, if the number of coils in the spring storage is designed for 1.5 turn of vehicle turns storage then on release of the stored energy the vehicle wheel may take several turns more than 1.5 turns before expending the energy released by the coils. The user may therefore experience more than 50% efficiency in such a braking episode. This phenomenon occurs because the spring resistance is several times more than resistance due to the friction in the bearings of the vehicle axle. Accordingly, the spring resistance is a function of the width, thickness and elasticity of the clock spring.

DETAILED DESCRIPTION OF THE INVENTION

The invention described herein is explained using specific disclosures/mechanisms exemplary details for better understanding. However, the invention disclosed can be worked on by a person skilled in the art without the use of these specific disclosures.

References in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic, or function described in detail thereby omitting known constructions and functions for clear description of the present invention.

The present invention is illustrated with reference to the accompanying drawings, throughout which reference numbers indicate corresponding parts in the various figures. These reference numbers are shown in bracket in the following description.

Accordingly, the present invention provides an epicyclic transmission gear and disk brake based regenerative braking device for pedal assisted geared vehicle having regenerative braking and energy storage features. In this one preferred embodiment, epicyclic transmission gear and disk brake based regenerative braking device is shown mounted on a bicycle. However, it is understood that the spring based regenerative braking system may be mounted on any other vehicle in other alternative embodiments of the present invention. In the context of the present invention, the epicyclic transmission gear and disk brake based regenerative braking device includes an epicyclic transmission unit and a clock spring torque storage module that are configured to be positioned on one side of the conventional hub and wheel and other side of the wheel is positioned with a main free wheel and chain sprocket. The epicyclic transmission gear unit connects to the vehicle wheel through a hub and acts as a bridge that transfers the wheel momentum to the clock spring in the storage module. The epicyclic transmission gear unit interacts with a disk brake through a brake lever and is capable of transmitting the wheel momentum in the form of torque even after the booster spring is fully wrapped. This situation is prevented from over stressing the spring by the calibration wheel that allows the outer casing to rotate facilitating an efficient way to protect the booster spring of the clock spring torque storage module from excess braking force. The clock spring torque storage module retains its fully charged state even after an episode of excess braking force since the calibrated restraint mechanism restores its function of securing the outer casing to the vehicle frame.

Figure 1:
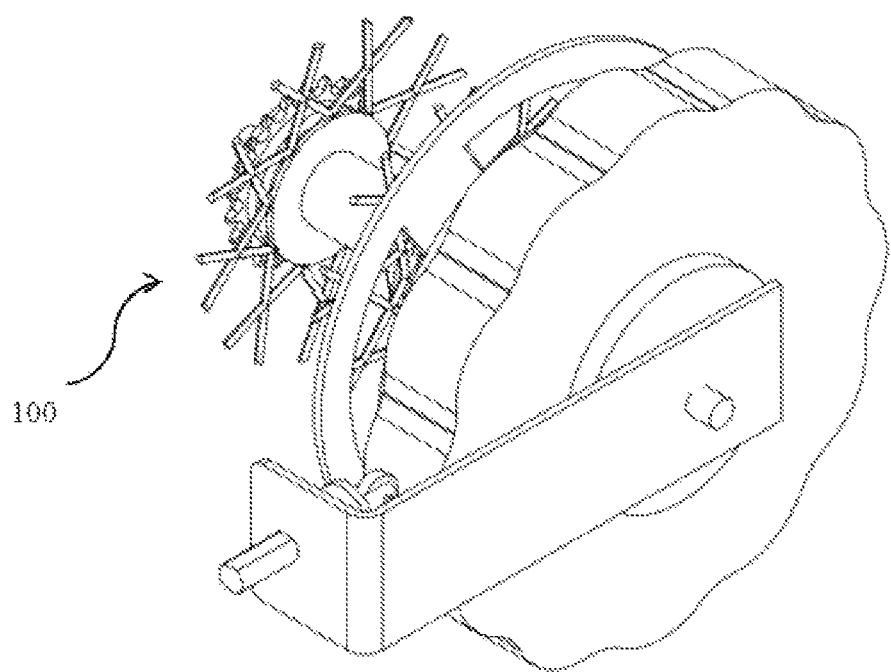
FIG. 1 is a front perspective view of a fully assembled epicyclic transmission gear and disk brake based regenerative braking device constructed in accordance with the present invention.
Figure 2:
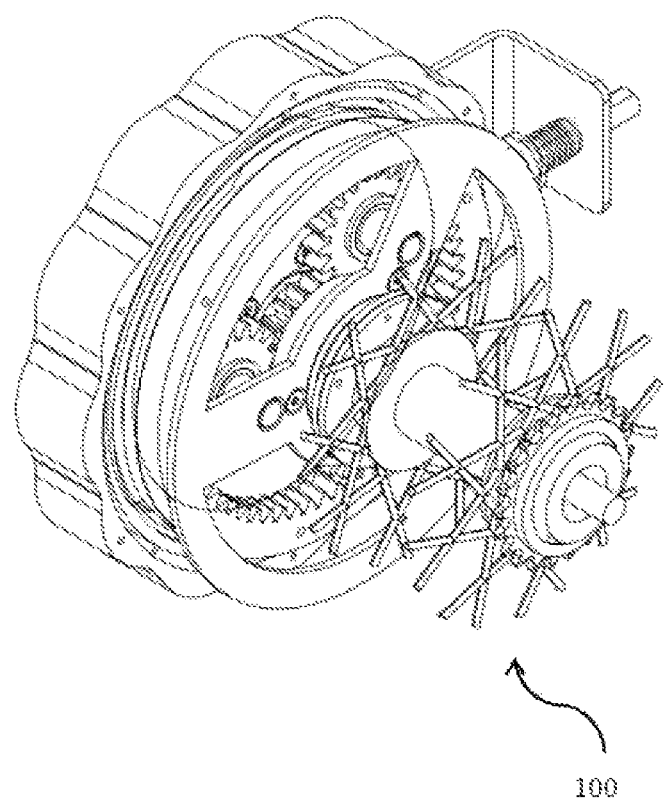
FIG. 2 is a rear perspective view of the epicyclic transmission gear and disk brake based regenerative braking device of FIG. 1.
Figure 3:
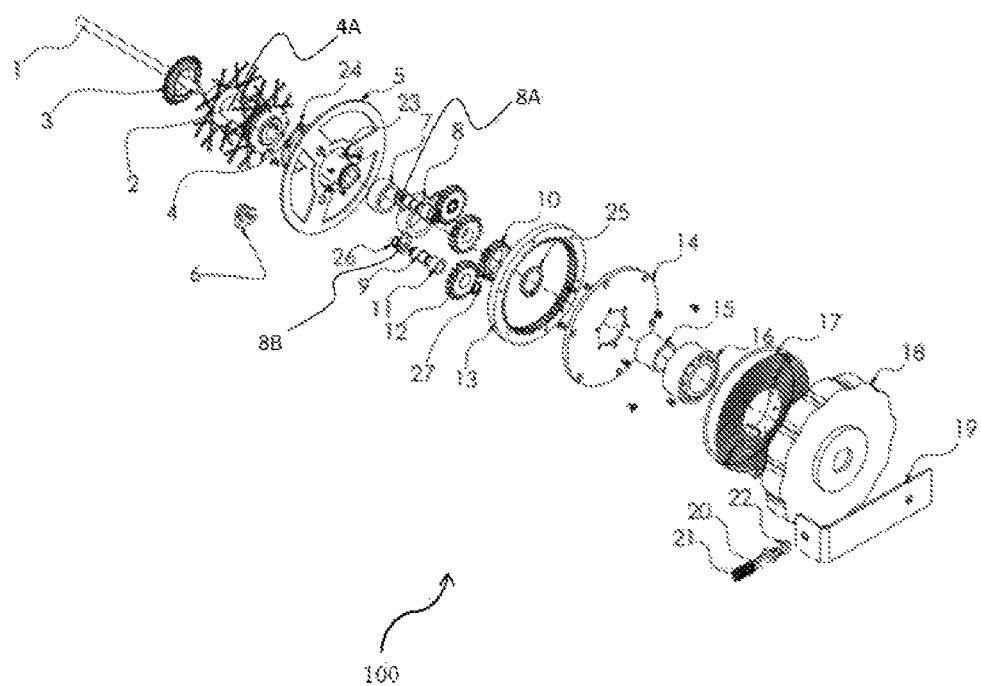
FIG. 3 is an exploded view of the epicyclic transmission gear and disk brake based regenerative braking device of FIG. 1 showing various components thereof.
Figure 4:
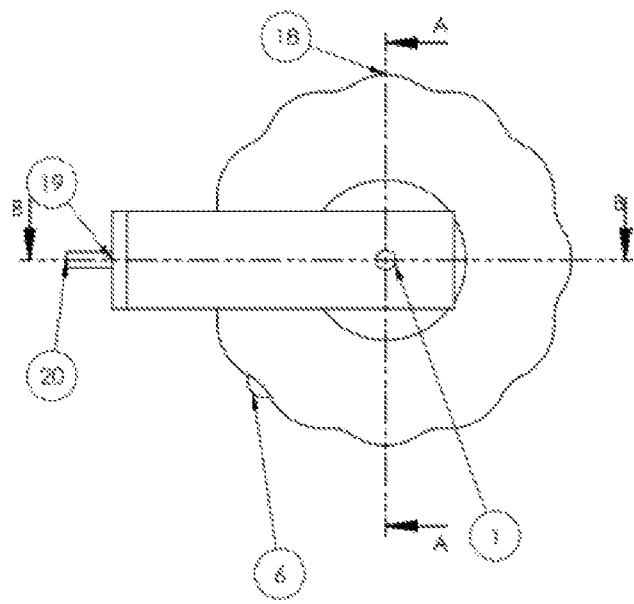
FIG. 4 is a front view of the of the epicyclic transmission gear and disk brake based regenerative braking device of FIG. 1.
Figure 5:
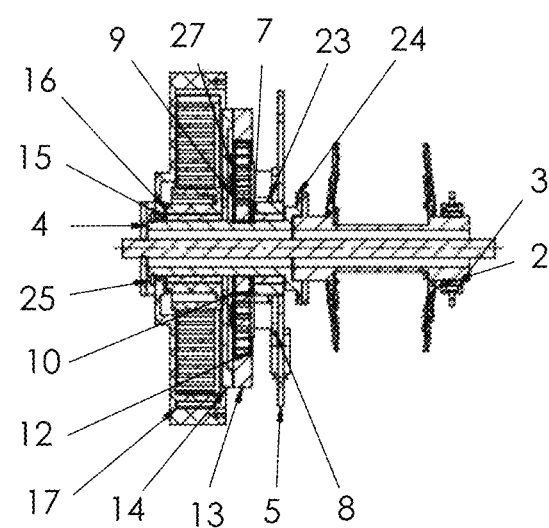
FIG. 5 is a cross-sectional view of the epicyclic transmission gear and disk brake based regenerative braking device of FIG. 4, taken along lines A-A.
Figure 6:
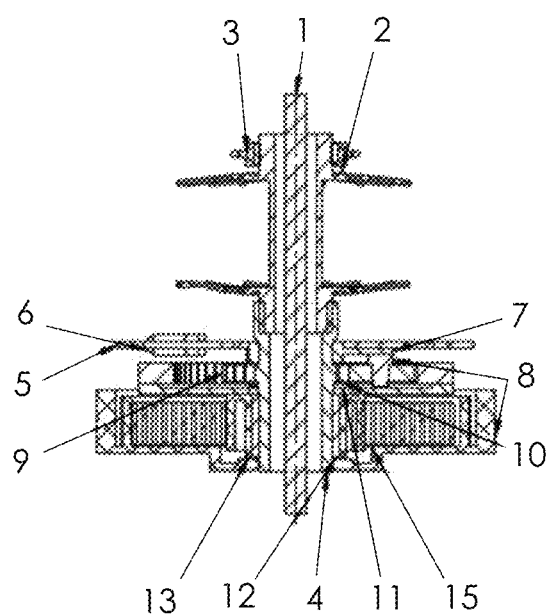
FIG. 6 is a cross-sectional side view of the epicyclic transmission gear and disk brake based regenerative braking device of FIG. 4, taken along lines B-B.

Referring to FIGS. 1 and 2, an epicyclic transmission gear and disk brake based regenerative braking device (100) adapted for pedal assisted geared vehicle with regenerative braking and energy storage features is shown. The epicyclic transmission gear and disk brake based regenerative braking device (100) is configured to be positioned on a conventional hub of a rear wheel of a vehicle. In this embodiment, the device (100) is shown mounted on a rear wheel of a geared vehicle. However, it is understood here that the device (100) may be mounted on rear hub of any other pedal/geared vehicle in other alternative embodiments of the present invention.

Referring to FIGS. 3, 4, 5 and 6, the epicyclic transmission gear and disk brake based regenerative braking device (100) includes a conventional hub (4A). The conventional hub has a central opening that receives a shaft (1). The conventional hub (4A) is held in position on the shaft by using an opposed pair of retaining rings. The conventional hub (4A) includes a pair of circular collars that has a plurality of holes defined thereon. The circular collars engage with a plurality of spokes of a rear wheel of the vehicle. The conventional hub (4A) receives a main freewheel (3) along one side thereof. The conventional hub (4A) connects to an extended hub (4) through a plurality of connectors (24). In this embodiment, the extended hub (4) is a sleeve that extends the rear hub (4A) on the far side of the vehicle from chain assembly being mounted on the main freewheel (3). The extended hub (4) is secured to the conventional hub (4A) to form an extension such that the extension surface is suitably machined to accommodate various components thereon.

The extended hub (4) receives a brake disc (5) on outer surface thereof. The brake disc (5) is connected to a disc brake clamp unit (6). The disk brake unit (6) is configured to stop the rotation of the brake disc (5) by arresting the spin of the disc. The brake disk (5) of the disk brake unit is connected to the planetary gear band carrier (8) of the epicyclic transmission unit. The disc brake clamp unit (6) connects to a brake cable (not shown) that further connects to a rear wheel friction brake lever/hand brake lever (not shown). The brake lever has an actuated position such that when the disk brake is operated, by squeezing the handle mounted lever, the vehicle de accelerates and eventually stops if the brake lever is squeezed long enough. In a released position of the brake lever, the vehicle accelerates to a velocity which varies but at times can be 50% of the original velocity. It is understood here that the terrain and the duration of squeezing of the brake lever would influence the velocity being achieved. The acceleration of the vehicle is synchronous to operation of the brake lever or it can be synchronous to a separate manually operated two position lever in an embodiment of the present invention. Thus, the stored energy can be released when desired through the manually operated two position lever. A first needle bush bearing (7) is positioned on the outer surface of the extended hub (4) adjacent to the disc brake carrier (5).

To the extended hub (4) is mounted the epicyclic transmission unit that includes a planet gear band/carrier plate (8). The planet gear band (8) positions on the first needle bush bearing (7). The planet gear band (8) has at least three arms (8A) that respectively receive a planet gear shaft (9) through respective openings (8B) thereof. Each planet gear shaft (9) is positioned with a planetary gear (12) thereby having a second needle bush bearing (11) positioned therebetween. A sun gear (10) is positioned on the extension hub (4). The sun gear (10) is configured to mesh with the planetary gears (12) such that the planetary gears (12) spin around their respective axis or around the sun gear (10) due to rotation facilitated by the planet gear band carrier (8). The sun gear (10) transfers momentum of the extended hub (4) to a ring gear (13) through the spinning action of the planetary gears (12).

The ring gear (13) is connected to a clock spring torque storage module. In this embodiment, the clock spring torque storage module includes an inner casing ring band (14), a one-way clutch bearing (15), an inner casing (16), a booster/clock spring (17) and outer casing (18). The inner casing ring band (14) is positioned adjacent to the ring gear (13). The one-way clutch bearing (15) is positioned adjacent to the epicyclic transmission unit on the extended hub (4) and receives inner casing (16) thereon. The outer casing (18) is mounted on the extended hub (4) concentrically with the inner casing (16). The inner casing (16), the booster spring (17) and the outer casing (18) form a spring cassette of the present invention. The booster spring (17) has a first end that connects to the outer casing (18). The booster spring (17) has a second end that connects to the inner casing (16). The first and second ends of the booster spring (17) are secured by means of slit openings in the surface of the inner casing (16) and outer casing (18). The booster spring (17) is positioned between the outer casing (18) and the inner casing (16) such that the clock spring (17) wraps during rotation of the inner casing (16) in a direction opposite to rotation of rear wheel (2). The outer casing (18) has a sinusoidal contoured edge designed to be arrested from spinning for a predetermined torque threshold.

The device (100) includes a strip chassis unit (19) that has a first end and a second end such that the first end is bolted on the shaft (1) of the hub (4A) and the second end that communicates with a calibrated restraint mechanism that includes a calibration wheel (22) loaded with a calibration screw and a spring (21). The calibration wheel (22) is configured to engage with a sinusoidal contoured surface of the outer casing (18) to arrest the outer casing (18) from spinning at a predetermined level of torque. The calibration wheel (22) is configured to sit and ride over the sinusoidal peak of the outer casing (18) under a calibrated pressure to enable the outer casing (18) to rotate, when a torque on the spring (17) is in excess of the predetermined torque, thereby facilitating spinning of the outer casing (18). The device (100) includes a first circlip (25), a second circlip (26) and a third circlip (27). The first circlip (25) assists in securing the epicyclic transmission unit on the extended hub (4). The second circlip (26) assists in securing the planet gear shaft (9) on the planet gear band (8). The third circlip (27) assists in securing the planet gears (12) on the needle bush bearing (11).

Referring to FIGS. 1-6, in operation, the one-way clutch bearing (15) binds the inner casing (16) to the extended hub (4) when rotating in the same direction of rotation of the wheel (2) when the inner casing is faster than the hub and allows free movement when rotating slower than the spin of the wheel (2) in the forward direction. This allows the inner casing (16) powers the extended hub (4) when the booster spring (17) discharges faster than the forward rotation of the extended hub (4) thereby getting disconnected from the extended hub (4) when the wheel (2) is spinning faster than the inner casing (16) in the forward direction. The one-way clutch bearing (15) also allows the inner casing (16) to charge when rotating opposite to the rotation of the wheel (2) without impeding the forward motion of the wheel (2).

In operation, the one-way clutch bearing (15) allows the inner casing (16) to turn backward for charging/coiling the booster spring (17) such that this reverse rotation is passed on to it through the ring gear (13). The bias of the spring (17) works against the rotation of the extended hub (4) through the ring gear (13), sun gear (10) and planetary gears (12) of the epicyclic transmission unit. This allows the vehicle to de-accelerate on application of the disc brake. It is understood here that the charging action occurs when the planet gear band connected to the disk brake is arrested.

In operation, the disk brake is configured to arrest the spin of the disk (5) in order to stop the rotation of the planetary gear band carrier (8) thereby making the ring gear (13) to rotate in a reverse direction of the sun gear (10). However, it is understood that the sun gear (10) always rotates in forward direction when the vehicle is in motion. The planetary gears (12) mesh with the stationery ring gear (13) and present a stationary surface in contact with the ring gear (13). Thus, in order for the sun gear (10) to rotate the planet gears (12) rotate around the axis of the sun gear (10). This causes the band or the carrier plate (8) to rotate while the sun gear (10) rotates in the forward rotation of the wheel (2). When the planetary band or carrier (8) is arrested by the operation of the disc brake lever the sun gear (10) transfers its momentum to the ring gear (13) through planetary gears (12) in a direction counter to the rotation of the ring gear (13). This coils the spring (17) through the inner casing (16) in the direction reverse to the rotation of the vehicle wheel (2).

In summary, the epicyclic transmission gear and disk brake based regenerative braking device (100) facilitates epicyclic transmission unit to transfer braking energy through arrangement of sun gear (10) and the planetary gears (12) to a clock spring (17) of the clock spring torque storage module in reverse rotation of the spring (17). In the context of the present invention, a disk brake is used to arrest the rotation of a sun-planetary gear assembly wherein the planet gear carrier/band (8) causes the sun gear (10) to be connected to the extended hub (4) to transfer the momentum available at the extended hub (4) to a ring gear (13) in reverse rotation direction to rotation of the rear wheel (2). Accordingly, the ring gear (13) connected to the inner casing (16) of the clock spring torque storage module charges the spring (17) by winding it in the reverse direction of the spin of the extended hub (4). However, it is understood that excess energy, after the spring (17) is fully wrapped, is dissipated through spinning of the outer casing (18) of the clock spring torque storage module that is constrained from rotation by a spring calibrated restraint wheel (22) that rides the sinusoidal surface of the outer casing (18).

Figure 7:
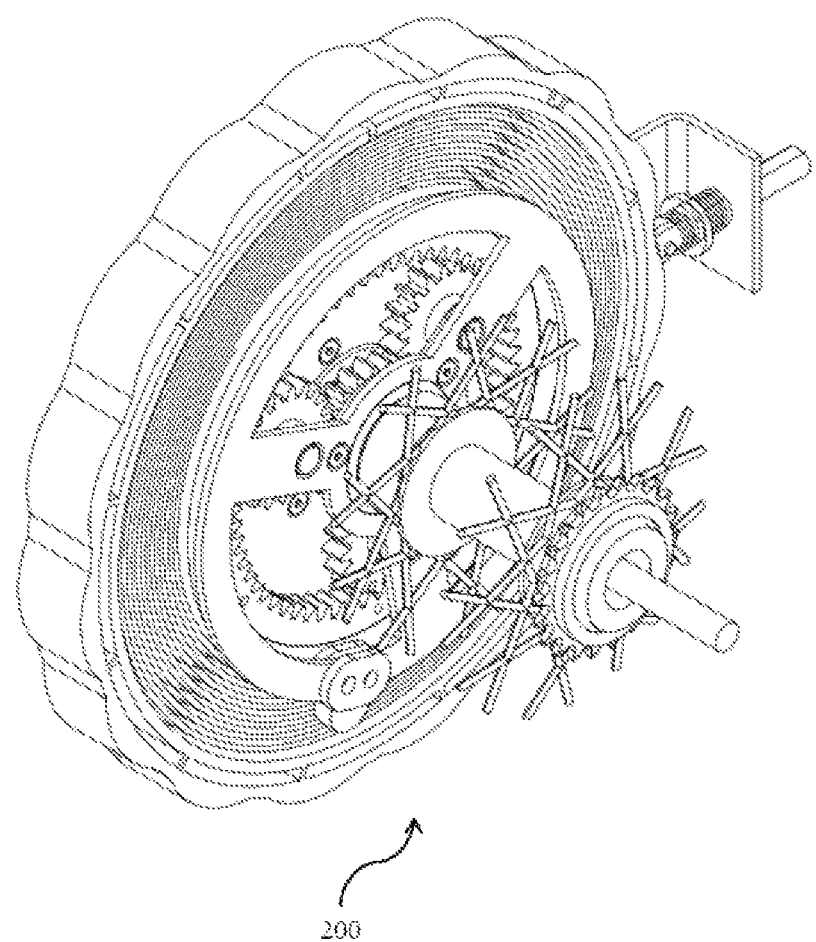
FIG. 7 is a rear perspective view of an alternative embodiment of the epicyclic transmission gear and disk brake based regenerative braking device of FIG. 1, wherein a clock spring torque storage module and an epicyclic transmission unit are concentrically positioned.
Figure 8:
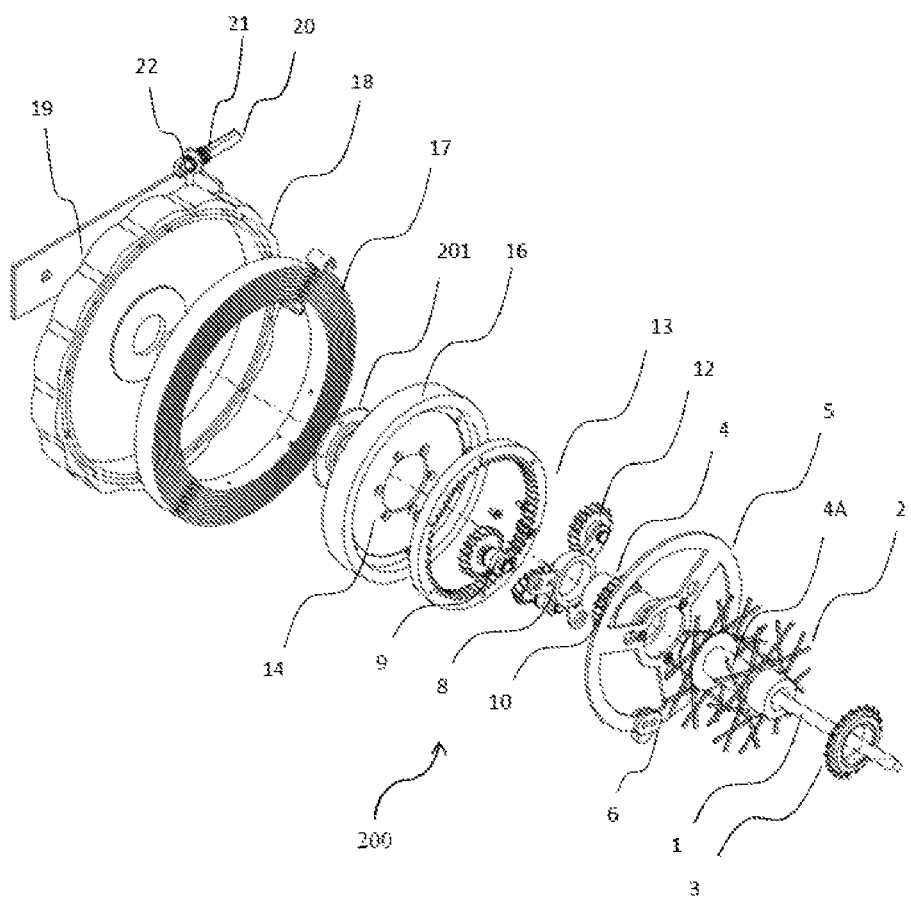
FIG. 8 is an exploded view of the epicyclic transmission gear and disk brake based regenerative braking device of FIG. 7.

Referring to FIGS. 7 and 8, an alternative embodiment of the epicyclic transmission gear and disk brake based regenerative braking device (100) is shown wherein regenerating functionality is achieved by positioning the clock spring torque storage module and the epicyclic transmission unit concentrically. In this one alternative embodiment, the epicyclic transmission gear and disk brake based regenerative braking device (100) is shown mounted on a bicycle hub. However, it is understood here that the spring based regenerative braking system may be mounted on any other vehicle in further alternative embodiments of the present invention.

In this alternative embodiment, the inner casing (16) of the clock spring torque storage module is concentrically mounted over a circumference of the ring gear (13). The inner casing ring band connector (14) is suitably increased in diameter and mounted with an integrated one-way clutch (201) over the sun gear (10) of the epicyclic transmission unit. It is understood here that the inner casing ring band 20 connector (14) is affixed to the inner casing (16) in this embodiment. The sinusoidal surface of the outer casing (18) is arrested by mating with the spring calibrated restraint wheel (22) of the strip chassis unit (19).

Referring to FIGS. 7-8, in operation, when the brake disc (5) of the disk brake unit (6) is arrested, the momentum of the sun gear (10) is transferred to the ring gear (13) in the reverse direction. This causes the inner casing (16) to rotate in a reverse direction to coil up the booster/clock spring (17). However, on release of the disc brake, the inner casing (16) rotates forward and transmits it's rotation to the integrated one way clutch (201) through the ring band connector (14) which in turn locks with the sun gear (10) thereby causing it to accelerate under the influence of the spring biased uncoiling action of the booster/clock spring (17). In this alternative embodiment, the epicyclic transmission gear and disk brake based regenerative braking device (100) is thinner in size and larger in diameter than the preferred embodiment of the present invention. This alternative embodiment of the epicyclic transmission gear and disk brake based regenerative braking device (100) is preferred when mounted over the conventional hub (4A) as it requires lesser space between the hub (4A) and a rear fork of the vehicle.

The foregoing description of specific embodiments of the present invention has been presented for purposes of illustration and description. They are not intended to be exhaustive or to limit the present invention to the precise forms disclosed, and obviously many modifications and variations are possible in light of above teaching.

The embodiments were chosen and described in order to best explain the principles of the present invention and its practical application, to thereby enable others, skilled in the art to best utilize the present invention and various embodiments with various modifications as are suited to the particular use contemplated.

It is understood that various omission and substitutions of equivalents are contemplated as circumstance may suggest or render expedient, but such are intended to cover the application or implementation without departing from the spirit or scope of the present invention.

The invention claimed is:

1. An epicyclic transmission gear and disk brake based regenerative braking device with regenerative braking and energy storage features, said epicyclic gear based regenerative braking device comprising:

an extended hub connected to a conventional hub of a rear wheel of the vehicle through a plurality of connectors, the extended hub having a first needle bush bearing positioned on outer surface thereof;

a disc brake clamp unit having a brake disc, the brake disc coaxially mounted on the extended hub, the disc brake clamp unit configured to arrest rotation of the brake disc, the disc brake clamp unit connecting to a hand brake lever of a hand brake;

an epicyclic transmission unit having a planet gear band, a sun gear, a ring gear and a plurality of planetary gears, the planet gear band positioned on the needle bush bearing, the planet gear band having a plurality of arms that receive a planetary gear shaft through respective openings thereof, each planetary gear shaft having a second needle bush bearing positioned thereon, each second needle bush bearing respectively receiving the planetary gear thereon, the sun gear positioning on the extended hub, the sun gear meshing with the plurality of planetary gears, the ring gear configured to receive momentum through the planetary gears in a direction reverse to rotation of the sun gear on arrested motion of the planet gear band, the planet gear band connecting to the brake disk of the disk brake unit to transfer momentum to the ring gear;

a clock spring torque storage module having an inner casing ring band, a one way clutch bearing, an inner casing, a booster/clock spring and an outer casing, the one way clutch bearing positioned on the extended hub, the one way clutch bearing receiving the inner casing thereon, the inner casing configured to receive momentum transfer from the ring gear, the outer casing having a sinusoidal contoured surface, the clock spring configured to be coiled during rotation of the inner casing in a direction opposite to rotation of rear wheel; and a strip chassis unit bolted on a shaft of the conventional hub, the strip chassis unit having a spring calibrated restraint wheel loaded with a calibration screw and a spring, the spring calibrated restraint wheel configured to engage with the sinusoidal contoured surface of the outer casing to arrest the outer casing from spinning below a predetermined torque.

2. The epicyclic transmission gear and disk brake based regenerative braking device as claimed in claim 1, wherein the inner casing and the outer casing respectively have an internal slit to mount respective end of the clock spring.

3. The epicyclic transmission gear and disk brake based regenerative braking device as claimed in claim 1, wherein the spring calibrated restraint wheel is configured to sit and ride over the sinusoidal peak of the outer casing under a calibrated pressure to enable the outer casing to rotate when a torque on the spring is in excess of the predetermined torque.

4. The epicyclic transmission gear and disk brake based regenerative braking device as claimed in claim 1, wherein the epicyclic transmission unit is secured on the extension hub with a first circlip.

5. The epicyclic transmission gear and disk brake based regenerative braking device as claimed in claim 1, wherein the planet gear shaft is secured on the planet gear band with a second circlip.

6. The epicyclic transmission gear and disk brake based regenerative braking device as claimed in claim 1, wherein each planetary gear is secured on respective needle bush bearing with a third circlip.

7. The epicyclic transmission gear and disk brake based regenerative braking device as claimed in claim 1, wherein the one way clutch bearing binds the inner casing to the extended hub while rotating in the same direction as the rotation of the wheel only when rotation of the one way clutch bearing is faster than the rotation of the wheel but releases influence of the extended hub when the rotation of the one way clutch bearing is slower than the rotation of the hub or the one way clutch bearing rotates in counter direction to the rotation of the wheel.

8. The epicyclic transmission gear and disk brake based regenerative braking device as claimed in claim 1, wherein the one-way clutch bearing allows free movement when rotating slower than the spin of the wheel in the forward direction.

9. The epicyclic transmission gear and disk brake based regenerative braking device as claimed in claim 1, wherein the inner casing powers the extended hub when the booster spring discharges faster than the forward rotation of the extended hub.

10. The epicyclic transmission gear and disk brake based regenerative braking device as claimed in claim 1, wherein, the one-way clutch bearing allows the inner casing to turn backward of the rotation of the wheel for charging/coiling the booster spring such that reverse rotation is passed on to it through the ring gear.

11. The epicyclic transmission gear and disk brake based regenerative braking device as claimed in claim 10, wherein bias of the spring works against the rotation of the extended hub mutually through the ring gear, sun gear and planetary gears to de-accelerate the vehicle on application of the disc brake.

12. The epicyclic transmission gear and disk brake based regenerative braking device as claimed in claim 1, wherein the disk brake unit arrests the spin of the brake disk such that the rotation of the planetary gear band carrier stops that makes the ring gear to rotate in a reverse direction of the sun gear.

* * * * *